United States Patent
Rohrig

(10) Patent No.: US 11,159,881 B1
(45) Date of Patent: Oct. 26, 2021

(54) DIRECTIONALITY IN WIRELESS COMMUNICATION

(71) Applicant: Hamilton Sundstrand Corporation, Charlotte, NC (US)

(72) Inventor: Jake Rohrig, Simsbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/097,062

(22) Filed: Nov. 13, 2020

(51) Int. Cl.
*H04R 5/00* (2006.01)
*H04R 3/00* (2006.01)
*H04R 1/40* (2006.01)
*H04R 5/02* (2006.01)

(52) U.S. Cl.
CPC ............ *H04R 3/005* (2013.01); *H04R 1/406* (2013.01); *H04R 2430/20* (2013.01)

(58) Field of Classification Search
CPC ..... H04R 3/005; H04R 1/406; H04R 2430/20
USPC ............................................ 381/17, 92, 300
See application file for complete search history.

(56) References Cited

U.S. PATENT DOCUMENTS

| | | |
|---|---|---|
| 5,905,464 A | 5/1999 | Lanciaux |
| 8,526,647 B2 | 9/2013 | Pedersen et al. |
| 9,949,040 B2 | 4/2018 | Bergmann et al. |
| 2020/0137509 A1* | 4/2020 | Stanek ............... H04R 29/002 |

* cited by examiner

*Primary Examiner* — Ammar T Hamid
(74) *Attorney, Agent, or Firm* — Cantor Colburn LLP

(57) ABSTRACT

A system includes a first communication system and a second communication system, each with a microphone, an array of speakers arranged to encircle a user of the communication system, a controller, and an array of antenna elements. In each communication system, the array of antenna elements transmits and receives over 360 degrees together, a positional correspondence between the array of speakers and the array of antenna elements is fixed, and the controller controls audio to be output only by speakers among the first array of speakers that correspond to antenna elements among the first array of antenna elements that receive communication.

20 Claims, 2 Drawing Sheets

DIRECTIONALITY IN WIRELESS COMMUNICATION

BACKGROUND

Exemplary embodiments pertain to the art of communication and, in particular, to directionality in wireless communication.

Extravehicular activity in deep space may refer to astronauts on the surface of a planet or outside a space vehicle in orbit, for example. Extravehicular activity requires the astronauts to wear extravehicular mobility units (EMUs) that include a helmet and full body suit supplied by an oxygen tank, for example, to maintain an environment that sustains the astronaut. Communication to, from, and among astronauts wearing EMUs is important for safe and successful completion of the mission. Similarly, communication among people in surface and sub-surface environments of the earth may be implemented wirelessly.

BRIEF DESCRIPTION

In one embodiment, a system includes a first communication system including a first microphone, a first array of speakers arranged to encircle a first user of the first communication system, a first controller, and a first array of antenna elements. The first array of antenna elements transmits and receives over 360 degrees together, a positional correspondence between the first array of speakers and the first array of antenna elements is fixed, and the first controller controls audio to be output only by speakers among the first array of speakers that correspond to antenna elements among the first array of antenna elements that receive communication. The system also includes a second communication system including a second microphone, a second array of speakers arranged to encircle a second user of the second communication system, a second controller, and a second array of antenna elements. The second array of antenna elements transmits and receives over 360 degrees together, a positional correspondence between the second array of speakers and the second array of antenna elements is fixed, and the second controller controls audio to be output only by speakers among the second array of speakers that correspond to antenna elements of the second array of antenna elements that receive communication.

Additionally or alternatively, in this or other embodiments, the first microphone converts speech by the first user to a first electrical signal.

Additionally or alternatively, in this or other embodiments, the first controller converts the first electrical signal to a first communication signal.

Additionally or alternatively, in this or other embodiments, the first communication system tracks a location of the second communication system based on receiving a tracking signal from the second communication system and determining which of one or more antenna elements among the first array of antenna elements received the tracking signal from the second communication system.

Additionally or alternatively, in this or other embodiments, the first communication system directs the first communication signal to the second communication system by transmitting the first communication signal using the one or more antenna elements among the first array of antenna elements or, based on a change of orientation of the first communication system, using another one or more antenna elements among the first array of antenna elements corresponding with a position of the one or more antenna elements among the first array of antenna elements when the tracking signal was received.

Additionally or alternatively, in this or other embodiments, the second communication system receives the first communication signal from the first communication system at one or more antenna elements among the second array of antenna elements, the second controller converts the first communication signal to an electrical signal, and one or more speakers among the second array of speakers that correspond to the one or more antenna elements among the second array of antenna elements outputs audio to the second user based on the electrical signal.

Additionally or alternatively, in this or other embodiments, the second microphone converts speech by the second user to a second electrical signal.

Additionally or alternatively, in this or other embodiments, the second controller converts the second electrical signal to a second communication signal.

Additionally or alternatively, in this or other embodiments, the second communication system tracks a location of the first communication system based on receiving a tracking signal from the first communication system and determining which one or more antenna elements among the second array of antenna elements received the tracking signal from the first communication system.

Additionally or alternatively, in this or other embodiments, the second communication system directs the second communication signal to the first communication system by transmitting the second communication signal using the one or more antenna elements among the second array of antenna elements or, based on a change of orientation of the second communication system, using another one or more antenna elements among the second array of antenna elements corresponding with a position of the one or more antenna elements among the second array of antenna elements when the tracking signal was received.

In another embodiment, a method includes assembling a first communication system, which includes arranging a first microphone to pick up audio from a first user, arranging a first array of speakers to encircle the first user, arranging a first array of antenna elements to transmit and receive over 360 degrees together, the arranging including fixing a positional correspondence between the first array of speakers and the first array of antenna elements, and coupling a first controller to the first microphone, the first array of speakers, and the first array of antenna elements and configuring the first controller to control output of audio by only speakers among the first array of speakers that correspond to antenna elements among the first array of antenna elements that receive communication. The method also includes assembling a second communication system, which includes arranging a second microphone to pick up audio from a second user, arranging a second array of speakers to encircle the second user, arranging a second array of antenna elements to transmit and receive over 360 degrees together, the arranging including fixing a positional correspondence between the second array of speakers and the second array of antenna elements, and coupling a second controller to the second microphone, the second array of speakers, and the second array of antenna elements and configuring the second controller to control output of audio by only speakers among the second array of speakers that correspond to antenna elements among the second array of antenna elements that receive communication.

Additionally or alternatively, in this or other embodiments, the method also includes configuring the first microphone to convert speech by the first user to a first electrical signal.

Additionally or alternatively, in this or other embodiments, the method also includes configuring the first controller to convert the first electrical signal to a first communication signal.

Additionally or alternatively, in this or other embodiments, the method also includes configuring the first controller to track a location of the second communication system by determining which of one or more antenna elements among the first array of antenna elements received a tracking signal from the second communication system.

Additionally or alternatively, in this or other embodiments, the method also includes configuring the first controller to direct the first communication signal to the second communication system by controlling transmission of the first communication signal to be by the one or more antenna elements among the first array of antenna elements or, based on a change of orientation of the first communication system, by another one or more antenna elements among the first array of antenna elements corresponding with a position of the one or more antenna elements among the first array of antenna elements when the tracking signal was received.

Additionally or alternatively, in this or other embodiments, the method also includes configuring the second controller to determine which one or more antenna elements among the second array of antenna elements received the first communication signal from the first communication system, to convert the first communication signal to an electrical signal, and to control one or more speakers among the second array of speakers that correspond to the one or more antenna elements among the second array of antenna elements to output audio to the second user based on the electrical signal.

Additionally or alternatively, in this or other embodiments, the method also includes configuring the second microphone to convert speech by the second user to a second electrical signal.

Additionally or alternatively, in this or other embodiments, the method also includes configuring the second controller to convert the second electrical signal to a second communication signal.

Additionally or alternatively, in this or other embodiments, the method also includes configuring the second controller to track a location of the first communication system by determining which one or more antenna elements among the second array of antenna elements received the tracking signal from the first communication system.

Additionally or alternatively, in this or other embodiments, the method also includes configuring the second controller to direct the second communication signal to the first communication system by controlling transmission of the second communication signal to be by the one or more antenna elements among the second array of antenna elements or, based on a change of orientation of the second communication system, using another one or more antenna elements among the second array of antenna elements corresponding with a position of the one or more antenna elements among the second array of antenna elements when the tracking signal was received.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As previously noted, communication to, from, and among astronauts (i.e., crew members) involved in extravehicular activity is important for the safety and success of a mission. In other environments, such as environments on the earth surface or sub-surface, conditions may require people to wear an atmospheric suit (e.g., hazmat suit) that maintains a habitable environment. Noise or other conditions in the environment may require that communication be implemented wirelessly.

Generally, in a deep space environment, for example, a microphone may be included in the helmet of the EMU to allow a crew member to speak and a speaker may be included in the helmet to allow the crew member to hear others. The communication may be transmitted to and from each crew member as a radio frequency (RF) signal. When crew members are communicating with each other in the extravehicular environment (e.g., on the surface of a planet, during a spacewalk), hearing a fellow crew member on the speaker will not indicate the relative position of that crew member. That is, the use of the microphone and speaker for communication among crew members (e.g., in the form of a headset), according to prior arrangements, prevents the natural directionality in human hearing.

Embodiments of the systems and methods detailed herein relate to directionality in wireless communication. Directionality in deep space extravehicular communication among crew members is specifically discussed for explanatory purposes. Directional audio communication among crew members facilitates locating each other immediately without verbal cues or locating devices, for example. As previously noted, while the deep space application is specifically discussed for explanatory purposes, the directional communication detailed herein may be implemented in any environment in which wireless communication is possible or necessary. For example, wireless communication among people in an environment with decreased visibility on the earth surface (e.g., fire fighters in a smoke-filled environment) or in a sub-surface environment may also benefit from the communication systems and methods according to one or more embodiments.

Figure 1:
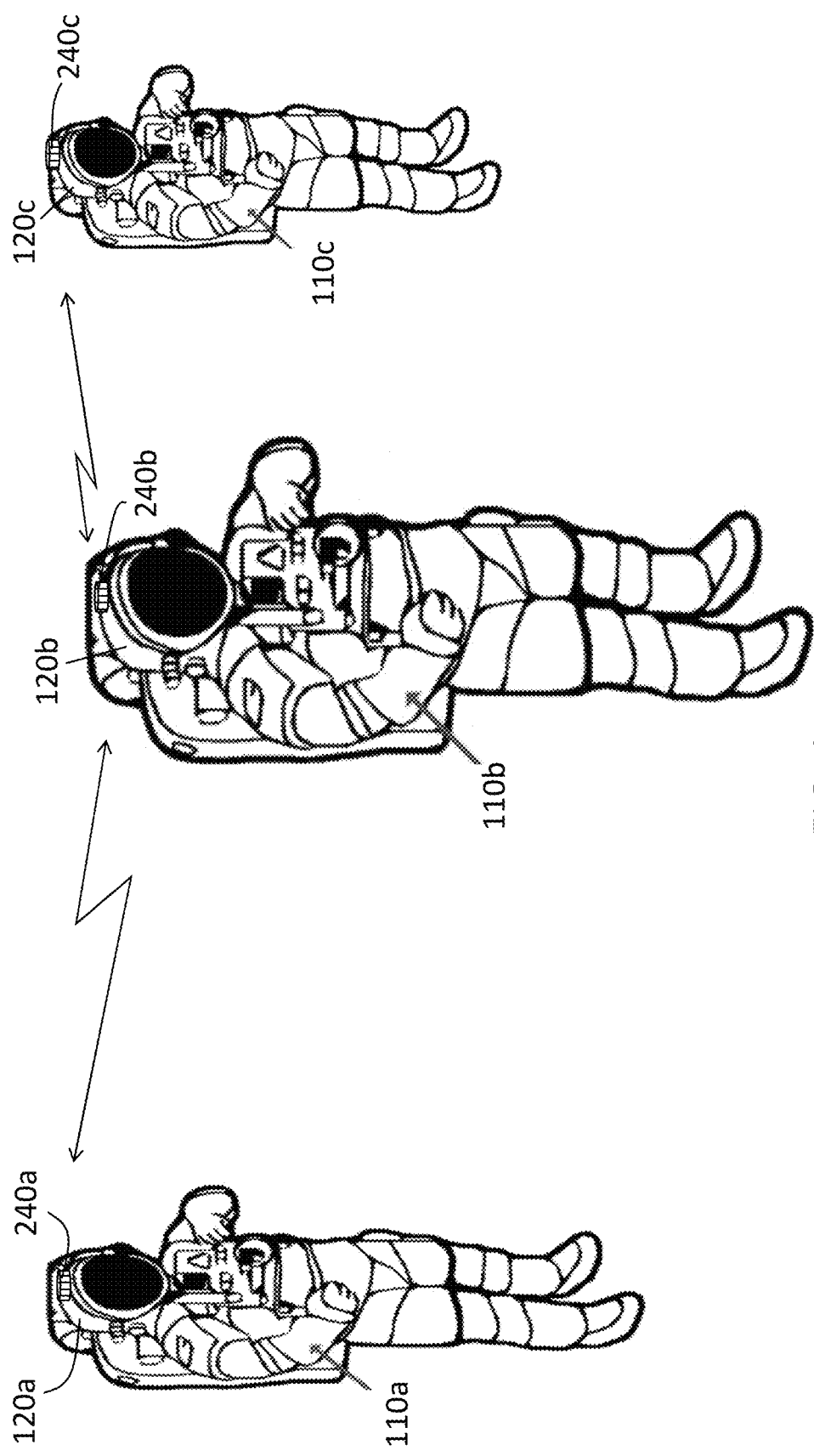
FIG. 1 illustrates wireless communication in an exemplary environment according to one or more embodiments.

FIG. 1 illustrates wireless communication in an exemplary environment according to one or more embodiments. Specifically, FIG. 1 illustrates a deep space environment (e.g., on a planetary surface), and three crew members in respective EMUs 110a, 110b, 110c (generally referred to as 110) are indicated. Each of the EMUs 110 includes a helmet 120a, 120b, 120c (generally referred to as 120) and a communication system 200 that is further detailed with reference to FIG. 2. The antennas 240a, 240b, 240c (generally referred to as 240) that are part of the communication systems 200 of each of the EMUs 110 are shown. The orientations of the two crew members in EMUs 110a, 110b is relevant to the discussion in FIG. 2. The crew member in the EMU 110*a* is behind and on the right of the crew member in the EMU 110*b*.

Figure 2:
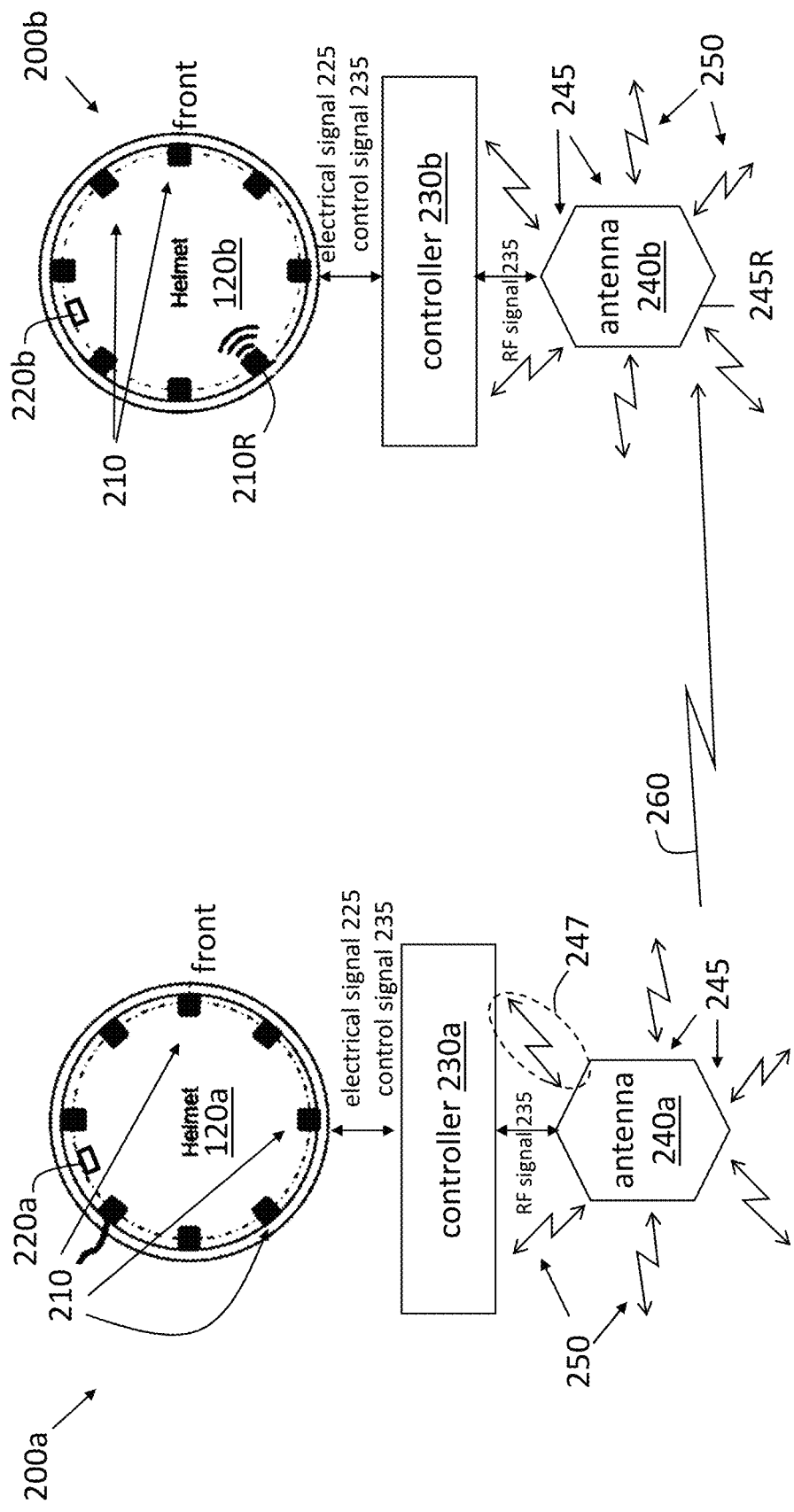
FIG. 2 is a block diagram of two exemplary wireless communication systems according to one or more embodiments.

FIG. 2 is a block diagram of two exemplary wireless communication systems 200*a*, 200*b* (generally referred to as 200) according to one or more embodiments. Each of the wireless communication systems 200 includes an array of speakers 210 and a microphone 220*a* or 220*b* (generally referred to as 220). The array of speakers 210 and the microphone 220 are shown within helmets 120*a*, 120*b* of the EMUs 110*a*, 110*b* shown in FIG. 1 according to an exemplary embodiment. The front of each of the helmets 120*a*, 120*b* shown in FIG. 2 is labeled for explanatory purposes. Each speaker 210 of the array is at a different position around the user (i.e., the wearer of the EMU 110) and, together, the array of speakers 210 spans 360 degrees around the user (i.e., surrounds the user). Each of the speakers 210 may be a piezoelectric effector according to an exemplary embodiment. Each of the wireless communication systems 200 also includes a controller 230*a*, 230*b* (generally referred to as 230) and an antenna 240*a*, 240*b* (generally referred to as 240).

The antenna 240 may be a phased array antenna including antenna elements 245 arranged to provide 360 degree coverage. Each antenna element 245 radiates greater RF energy or receives greater power in a specific direction (e.g., normal to the antenna element 245 or at another specific angle). The area of greater power (i.e. RF field strength) is referred to as the main lobe 247, an exemplary one of which is shown for one exemplary antenna element 245. Using phase shifters, the controller 230 may steer the direction of the main lobe 247. The number of antenna elements 245 and their arrangement is not limited by the exemplary embodiment shown in FIG. 2. The number of antenna elements 245 used and the narrowness of the beam of each controls the resolution of the directionality according to one or more embodiments.

As indicated in FIG. 2, each of the communication systems 200 transmits tracking signals 250 to locate the other communication systems 200. The tracking signals 250 may be transmitted periodically, for example. The tracking signal 250 may be broadcast in all directions and may optionally include an identifier of the communication system 200. That is, each of the antenna elements 245 may simultaneously or sequentially transmit the tracking signal 250 on a periodic basis. The sequential transmission may be by more than one antenna element 245 (e.g., every other antenna element 245 transmits at once).

A receiving communication system 200 determines the relative location of the transmitting communication system 200 based on the direction from which the tracking signal 250 was received. That is, the direction corresponding to the one or more antenna elements 245 within the antenna 240 that receive the tracking signal 250 indicates the relative orientation of the sending communication system 200. The timing and strength of the received tracking signal 250 indicates the relative direction of the main lobe 247 of the transmitter. In this way, each communication system 200 may know the location of other communication systems 200 (i.e., other crew members) at all times. The controller 230 of a given communication system 200 may generate the tracking signal 250 for transmission by the antenna 240 and may process the tracking signals 250 received by the antenna 240.

The exemplary communication signal 260 indicated in FIG. 2 is from the communication system 200*a* to the communication system 200*b*. This communication signal 260 is generated when the crew member wearing the helmet 120*a* speaks, and the microphone 220*a* in the helmet 120*a* picks up the audio. The microphone 220*a* converts the audio to an electrical signal 225 that is provided to the controller 230*a*. The controller 230*a* generates an RF signal 235 corresponding with the electrical signal 225. Based on the previously discussed tracking, the controller 230*a* knows the relative position of every other communication system 200 (e.g., communication systems 200*b* and 200*c* in the exemplary case shown in FIG. 1). As such, the controller 230*a* selects antenna elements 245 within the antenna 240*a* and steers the main lobe 247 of the selected antenna elements 245 such that the antenna 240*a* emits the RF signal 235 in the direction(s) in which the communication signal 260 should be transmitted.

The selected antenna elements 245 will correspond with the direction of the communication system 200*b* and the communication system 200*c* in the exemplary case illustrated in FIG. 1. As noted with reference to FIG. 1, the crew member in the EMU 110*a* is behind and to the right of the crew member in the EMU 110*b*. Thus, the direction of transmission of the communication signal 260 from the antenna 240*a* is to the front left. This is indicated by the main lobe 247 shown for the antenna 240*a*, which corresponds with the direction of transmission of the communication signal 260 to reach the crew member (the back right of the crew member) in the EMU 110*b*. By limiting the number of antenna elements 245 that transmit to those that are oriented and directed to other communication systems 200, the transmit power of each transmitting antenna element 245 may be increased.

The communication signal 260 from the communication system 200*a* is received by the communication system 200*b* (and by the communication system 200*c* according to the exemplary case illustrated in FIG. 1). For explanatory purposes, the processes at the communication system 200*b* are discussed. Based on the antenna elements 245 that make up the antenna 240*b* of the communication system 200*b*, the direction from which the communication signal 260 arrived is known to the controller 230*b*. That is, the direction of arrival of the communication signal 260 will correspond with the particular antenna element 245R that receives the communication signal 260. The controller 230*b* obtains the RF signal 235 and the direction information. The controller 230*b* provides an electrical signal 225 that corresponds with the communication signal 260. The controller 230*b* also provides a control signal 235 to activate only one or a subset of the array of speakers 210 that correspond with the antenna element 245R.

In the exemplary case, only speaker 210R is activated to output an audio signal that corresponds with the audio that was spoken by the crew member wearing helmet 120*a*. The front of each of the helmets 120*a*, 120*b* is indicated for explanatory purposes. Based on the relative positions shown in FIG. 1, the output from speaker 210R may be behind and to the right of the crew member wearing the EMU 110*b*. This direction corresponds with the relative position of the crew member wearing the EMU 110*a*. Thus, the output of audio from the speaker 210R would indicate the relative position of the crew member who generated the audio.

This directionality is not affected by the orientation of the crew members. That is, the positional correspondence between the antenna elements 245 and the speakers 210 is fixed. For example, the antenna 240 may be affixed to the helmet 120, as shown in FIG. 1. Thus, when a communication signal 260 is received by the antenna element 245R, the speaker 210R will be activated by the controller 230*b* regardless of which direction the crew member wearing the helmet 120*b* is facing. In the exemplary scenario of FIG. 1, if the wearer of the EMU 110*b* turns 180 degrees, then the antenna element 245 that is diagonally across from the antenna element 245R will receive the communication signal 260 from the wearer of the EMU 110*a*. As a result, the speaker 210 diagonally across from the speaker 210R will play the audio.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
   a first communication system including a first microphone, a first array of speakers arranged to encircle a first user of the first communication system, a first controller, and a first array of antenna elements, wherein the first array of antenna elements is configured to transmit and receive over 360 degrees together, a positional correspondence between the first array of speakers and the first array of antenna elements is fixed and the first controller is configured to control audio to be output only by speakers among the first array of speakers that correspond to antenna elements among the first array of antenna elements that receive communication, and
   a second communication system including a second microphone, a second array of speakers arranged to encircle a second user of the second communication system, a second controller, and a second array of antenna elements, wherein the second array of antenna elements is configured to transmit and receive over 360 degrees together, a positional correspondence between the second array of speakers and the second array of antenna elements is fixed and the second controller is configured to control audio to be output only by speakers among the second array of speakers that correspond to antenna elements of the second array of antenna elements that receive communication.

2. The system according to claim 1, wherein the first microphone is configured to convert speech by the first user to a first electrical signal.

3. The system according to claim 2, wherein the first controller is configured to convert the first electrical signal to a first communication signal.

4. The system according to claim 3, wherein the first communication system is configured to track a location of the second communication system based on receiving a tracking signal from the second communication system and determining which of one or more antenna elements among the first array of antenna elements received the tracking signal from the second communication system.

5. The system according to claim 4, wherein the first communication system is configured to direct the first communication signal to the second communication system by transmitting the first communication signal using the one or more antenna elements among the first array of antenna elements or, based on a change of orientation of the first communication system, using another one or more antenna elements among the first array of antenna elements corresponding with a position of the one or more antenna elements among the first array of antenna elements when the tracking signal was received.

6. The system according to claim 5, wherein the second communication system is configured to receive the first communication signal from the first communication system at one or more antenna elements among the second array of antenna elements, the second controller converts the first communication signal to an electrical signal, and one or more speakers among the second array of speakers that correspond to the one or more antenna elements among the second array of antenna elements outputs audio to the second user based on the electrical signal.

7. The system according to claim 1, wherein the second microphone is configured to convert speech by the second user to a second electrical signal.

8. The system according to claim 7, wherein the second controller is configured to convert the second electrical signal to a second communication signal.

9. The system according to claim 8, wherein the second communication system tracks a location of the first communication system based on receiving a tracking signal from the first communication system and determining which one or more antenna elements among the second array of antenna elements received the tracking signal from the first communication system.

10. The system according to claim 9, wherein the second communication system directs the second communication signal to the first communication system by transmitting the second communication signal using the one or more antenna elements among the second array of antenna elements or, based on a change of orientation of the second communication system, using another one or more antenna elements among the second array of antenna elements corresponding with a position of the one or more antenna elements among the second array of antenna elements when the tracking signal was received.

11. A method comprising:
    assembling a first communication system, comprising:
       arranging a first microphone to pick up audio from a first user;
       arranging a first array of speakers to encircle the first user;
       arranging a first array of antenna elements to transmit and receive over 360 degrees together, the arranging including fixing a positional correspondence between the first array of speakers and the first array of antenna elements;
       coupling a first controller to the first microphone, the first array of speakers, and the first array of antenna elements and configuring the first controller to control output of audio by only speakers among the first array of speakers that correspond to antenna elements among the first array of antenna elements that receive communication; and assembling a second communication system, comprising:
arranging a second microphone to pick up audio from a second user;
arranging a second array of speakers to encircle the second user;
arranging a second array of antenna elements to transmit and receive over 360 degrees together, the arranging including fixing a positional correspondence between the second array of speakers and the second array of antenna elements;
coupling a second controller to the second microphone, the second array of speakers, and the second array of antenna elements and configuring the second controller to control output of audio by only speakers among the second array of speakers that correspond to antenna elements among the second array of antenna elements that receive communication.

12. The method according to claim 11, further comprising configuring the first microphone to convert speech by the first user to a first electrical signal.

13. The method according to claim 12, further comprising configuring the first controller to convert the first electrical signal to a first communication signal.

14. The method according to claim 13, further comprising configuring the first controller to track a location of the second communication system by determining which of one or more antenna elements among the first array of antenna elements received a tracking signal from the second communication system.

15. The method according to claim 14, further comprising configuring the first controller to direct the first communication signal to the second communication system by controlling transmission of the first communication signal to be by the one or more antenna elements among the first array of antenna elements or, based on a change of orientation of the first communication system, by another one or more antenna elements among the first array of antenna elements corresponding with a position of the one or more antenna elements among the first array of antenna elements when the tracking signal was received.

16. The method according to claim 15, further comprising configuring the second controller to determine which one or more antenna elements among the second array of antenna elements received the first communication signal from the first communication system, to convert the first communication signal to an electrical signal, and to control one or more speakers among the second array of speakers that correspond to the one or more antenna elements among the second array of antenna elements to output audio to the second user based on the electrical signal.

17. The method according to claim 11, further comprising configuring the second microphone to convert speech by the second user to a second electrical signal.

18. The method according to claim 17, further comprising configuring the second controller to convert the second electrical signal to a second communication signal.

19. The method according to claim 18, further comprising configuring the second controller to track a location of the first communication system by determining which one or more antenna elements among the second array of antenna elements received the tracking signal from the first communication system.

20. The method according to claim 19, further comprising configuring the second controller to direct the second communication signal to the first communication system by controlling transmission of the second communication signal to be by the one or more antenna elements among the second array of antenna elements or, based on a change of orientation of the second communication system, using another one or more antenna elements among the second array of antenna elements corresponding with a position of the one or more antenna elements among the second array of antenna elements when the tracking signal was received.

* * * * *